US008131150B2

(12) United States Patent
Feuer et al.

(10) Patent No.: US 8,131,150 B2
(45) Date of Patent: Mar. 6, 2012

(54) TUNABLE BIDIRECTIONAL MULTIPLEXER/DEMULTIPLEXER FOR OPTICAL TRANSMISSION SYSTEM

(75) Inventors: Mark D. Feuer, Colts Neck, NJ (US); Sheryl L. Woodward, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 903 days.

(21) Appl. No.: 11/448,339

(22) Filed: Jun. 7, 2006

(65) Prior Publication Data

US 2007/0286605 A1    Dec. 13, 2007

(51) Int. Cl.
*H04J 14/02* (2006.01)
*H04J 14/00* (2006.01)
(52) U.S. Cl. ............... 398/83; 398/48; 398/55
(58) Field of Classification Search .......... 398/83, 398/45–57
See application file for complete search history.

(56) References Cited

U.S. PATENT DOCUMENTS

| | | | |
|---|---|---|---|
| 5,345,332 A | 9/1994 | daSilva et al. | |
| 6,134,036 A | 10/2000 | Andreozzi et al. | |
| 6,240,222 B1* | 5/2001 | Bergmann | 385/24 |
| 6,266,460 B1 | 7/2001 | Doerr | |
| 6,288,810 B1 | 9/2001 | Grasso et al. | |
| 6,978,061 B1 | 12/2005 | Tabuchi | |
| 2002/0196493 A1* | 12/2002 | Marom | 359/127 |
| 2004/0208505 A1* | 10/2004 | Kinoshita et al. | 398/19 |
| 2006/0228115 A1* | 10/2006 | Binetti et al. | 398/83 |
| 2007/0172240 A1* | 7/2007 | Terai et al. | 398/83 |

FOREIGN PATENT DOCUMENTS

| | | |
|---|---|---|
| DE | 10 2004 043713 A1 | 3/2006 |
| FR | 2756 689 | 6/1998 |
| WO | WO 02/03587 | 1/2002 |
| WO | WO 2005076658 A1 * | 8/2005 |
| WO | WO 2006035520 A1 * | 4/2006 |

OTHER PUBLICATIONS

Intel IXF30009/30010/30011 Optical Transport Processors, 2004, pp. 1-6.*
Patent Cooperation Treaty, PCT International Search Report, PCT/US2007/013486, International Filing Date Jul. 6, 2007.

* cited by examiner

*Primary Examiner* — Kenneth N Vanderpuye
*Assistant Examiner* — Daniel Dobson

(57) ABSTRACT

A tunable bidirectional multiplexer/demultiplexer (MUX/DEMUX) is disclosed for adding and dropping wavelength channels between an optical transmission system and at least one optical transceiver. The MUX/DEMUX includes at least one add port for adding wavelength channels, at least one drop port for dropping wavelength channels, and at least one first optical circulator coupled to the at least one drop port and the at least one add port. The MUX/DEMUX further includes at least one 1×N wavelength-selective switch coupled to the at least one first optical circulator, and at least one second optical circulator coupled to at least one transceiver port on a second side of the at least one wavelength-selective switch, where the optical circulators and switching components are disposed within a common housing. The at least one wavelength-selective switch and ports are configured such that an optical signal communicated from the at least one transceiver port to the at least one add port follows a first optical path, and an optical signal communicated from the at least one drop port to the at least one transceiver port follows a second optical path, where a portion of the first and second optical paths are the same.

10 Claims, 4 Drawing Sheets

TUNABLE BIDIRECTIONAL MULTIPLEXER/DEMULTIPLEXER FOR OPTICAL TRANSMISSION SYSTEM

BACKGROUND OF THE INVENTION

The present invention relates generally to optical networking, and more particularly, to a tunable bidirectional multiplexer/demultiplexer for an optical transmission system in which added and dropped signals follow a common optical path through a wavelength-selective switch.

The development of optical fiber communication technologies has enabled exponential growth in the capacity of backbone networks. Commercially deployed dense-wavelength-division multiplexing (DWDM) optical communication systems can now carry over 1 Tbps in a single fiber, and experimental applications have demonstrated much greater capacities.

Fiber optic distribution networks are becoming increasingly important for the provision of high bandwidth data links to commercial and residential locations. Such systems employ optical data transmitters and receivers ("transceivers") throughout the fiber optic distribution network. These transceivers generate optical signals for optical transmission over optical fibers and receive optical signals from the fibers for processing or forwarding. In some systems (typically those found in networks carrying asymmetric traffic, such as CATV systems) the transmitters (for generating optical signals) and the receivers might not be integrated into a single unit.

In a traditional WDM system, a single optical fiber simultaneously communicates a plurality of different communication channels in light of different wavelengths. Generally, each communication channel has an assigned central wavelength and channel spacing is defined for the network. DWDM network standards have optical channels with frequency separations of 25, 50 and 100 GHZ.

As optical technology has become more sophisticated, additional network functionality has migrated from the electronic domain to the optical domain. In the past, transmission systems were all point-to-point. All wavelengths on a system were transmitted between the same two nodes. To reach their final destination, signals were routed from one point-to-point transmission to another, with an optical-electrical-optical conversion at each node along the way. The optical transmission systems were used for transmission only. To dynamically redirect a signal's path it was converted to an electrical signal, and switching was performed in the electrical domain.

Many modern commercial optical systems have the ability to add/drop wavelengths from a line system at a node, while other wavelengths pass through the node on an express path. When an add/drop multiplexer can be dynamically adjusted it is known as a reconfigurable-optical-add-drop multiplexer (ROADM). Advanced ring networks with ROADM's are being widely deployed. These allow a transmission system to serve multiple nodes without requiring that all wavelengths be regenerated at each node.

In mesh networks, where many nodes may be connected to three or more other nodes, an all-optical photonic-cross-connect (PXC) can provide similar functionality.

Another recent innovation in optical networks is the availability of tunable transmitters. These transmitters have a tunable laser, so that the signals they transmit can be carried on any of the system's wavelengths. This enables a transceiver to be used for any wavelength channel. Currently, this makes it easier to provision new wavelengths, and maintain spare parts for the network's transceivers. The receiver portion of the transceiver can convert any wavelength from an optical to an electrical signal, but it must be preceded by an optical filter, so that only one wavelength channel reaches the optical receiver.

If all the elements of the network were tunable, then additional benefits could be achieved. Wavelengths could be dynamically routed throughout the network. Initially this would be used to provide rapid provisioning, but it could eventually be used to provide protection switching, or even to provide novel services that require very rapid wavelength switching. With tunable transceivers and ROADM's already present in deployed networks, the last component of commercially available networks to be tunable is the wavelength multiplexer and demultiplexer. The wavelength multiplexer lies between the tunable transmitter(s) and the add port of the line system. The wavelength demultiplexer lies between the receiver(s) and the drop port of the line system. The add/drop port may be located at the line system's end terminal, or at a ROADM or PXC. A typical wavelength multiplexer or demultiplexer has wavelength-specific ports for the connections to the transceivers, so that once the transmitter is connected to a port of the multiplexer or demultiplexer it must be tuned to that port's wavelength in order to transmit the signal onto the line system, and the receiver can only detect the signal at the receive port's assigned wavelength.

Most WDM components and systems use separate fibers for transmission in each direction, e.g. signals going from East to West travel on one fiber, while the signals going from West to East travel on another fiber. We shall refer to systems and components which transmit signals in only one direction on each fiber as unidirectional, while those which carry signals in both directions on a single fiber are referred to as bidirectional.

Tunable unidirectional wavelength multiplexers and demultiplexers for adding and dropping a wavelength channel to and from a transmission system with a node are known in the art. It is also known that these tunable multiplexers may comprise wavelength-selective switches (WSSs) on the multiplexer side to multiplex a plurality of wavelength channels that are being added to the optical transmission system. Tunable filters or an additional WSS can be utilized to demultiplex wavelength channels that are dropped from the optical transmission system to the local terminal. WSSs are commercially available devices that dynamically route signals from the input port(s) to the output port(s) based on the wavelength of the signal, in response to control signals that set the WSS's connection state. In unidirectional multiplexers and demultiplexers, separate optical components are used to multiplex and demultiplex the signals.

SUMMARY OF INVENTION

In accordance with an aspect of the present invention, a tunable bidirectional multiplexer/demultiplexer (MUX/DEMUX) is disclosed for adding and dropping wavelength channels between an optical transmission system and at least one optical transceiver. The MUX/DEMUX includes at least one add port for adding wavelength channels to the optical transmission system, at least one drop port for dropping wavelength channels from the optical transmission system, and at least one first optical circulator coupled to the at least one drop port and the at least one add port. The MUX/DEMUX further includes at least one 1×N WSS having a single input/output port on a first side for receiving and outputting multiplexed optical signals, and a plurality of input/output ports on a second side for receiving a plurality of multiplexed or individual optical signals, where the input/output port on the first side is coupled to the at least one first optical circulator.

Additionally, the MUX/DEMUX includes at least one WSS on the output side of the MUX/DEMUX (possibly the same one, but it might be another WSS if the MUX/DEMUX comprises cascaded WSSs) having a single input/output port on a first side for receiving and outputting multiplexed optical signals, and a plurality of input/output ports on a second side for receiving a plurality of multiplexed or individual optical signals, where at least one of the input/output ports on the second side of the at least one WSS is configured as a transceiver port. At least one second optical circulator is coupled to the at least one transceiver port on a second side of the at least one WSS, and further to a line transmitter and line receiver of the at least one optical transceiver. The at least one WSS and ports are configured such that an optical signal communicated from the at least one transceiver port to the at least one add port follows a first optical path, and an optical signal communicated from the at least one drop port to the at least one transceiver port follows a second optical path, where a portion of the first and second optical paths are the same.

In one embodiment, the at least one second optical circulator is packaged with the at least one wavelength-selective switch in a housing as part of the MUX/DEMUX assembly. In another embodiment, the at least one second optical circulator is disposed within a housing of the at least one optical transceiver.

In one embodiment, the optical transceivers may perform optical-to-electrical (O/E) conversion for the receive function and electrical-to-optical (E/O) conversion for the transmit function. However, to one skilled in the art, it will be apparent that an all-optical regenerator or other all-optical device may be used for either the transmit or the receive function, or both, without an E/O or O/E conversion process. Thus, all of the advantages, descriptions, and claims or the present invention will be understood to apply to optical transceivers operating with or without E/O or O/E conversion.

These and other advantages of the invention will be apparent to those of ordinary skill in the art by reference to the following detailed description and the accompanying drawings.

DETAILED DESCRIPTION OF THE PREFERRED EMBODIMENTS

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
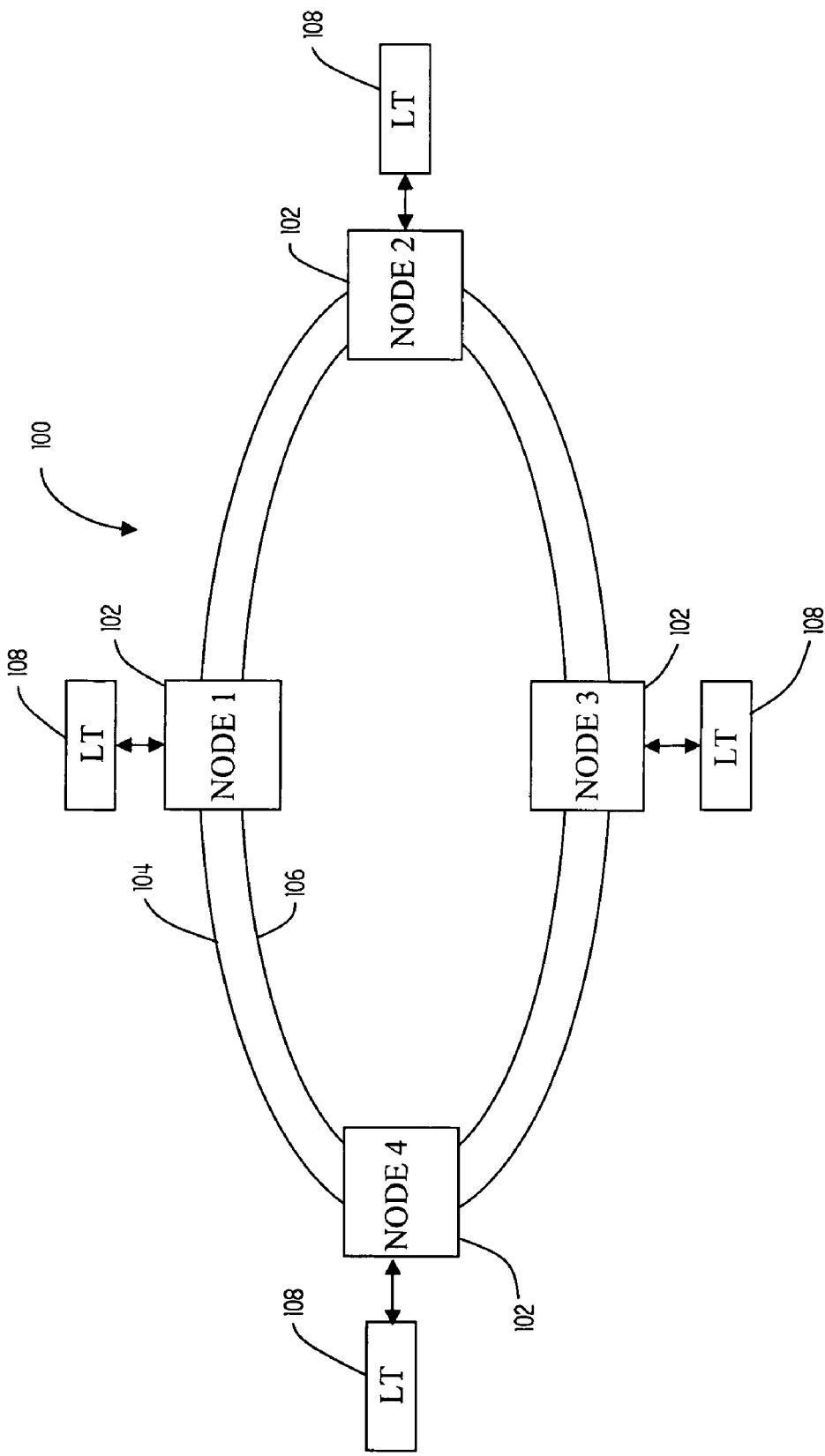
FIG. 1 is a schematic of an exemplary unidirectional optical communications system.

FIG. 1 is a schematic of an exemplary optical communications system comprising an illustrative ring-shaped network 100 having a plurality of add/drop nodes 102 that are configured in accordance with an aspect of the invention as described further below. It will be appreciated by those skilled in the art that alternative network topologies may be employed in accordance with the invention, the depicted ring structure being merely exemplary. A first fiber 104 carries optical traffic in a first direction, and a second fiber 106 carries optical traffic in a second direction. Each add/drop node 102 is adapted for selectively dropping wavelength channels from fiber 106 to a local terminal 108 associated with the add/drop node 102. Conversely, the add/drop node 102 can add wavelength channels from the local terminal to fiber 104. A plurality of amplifiers and wavelength blockers are provided between the nodes 102 as shown in FIG. 2.

Figure 2:
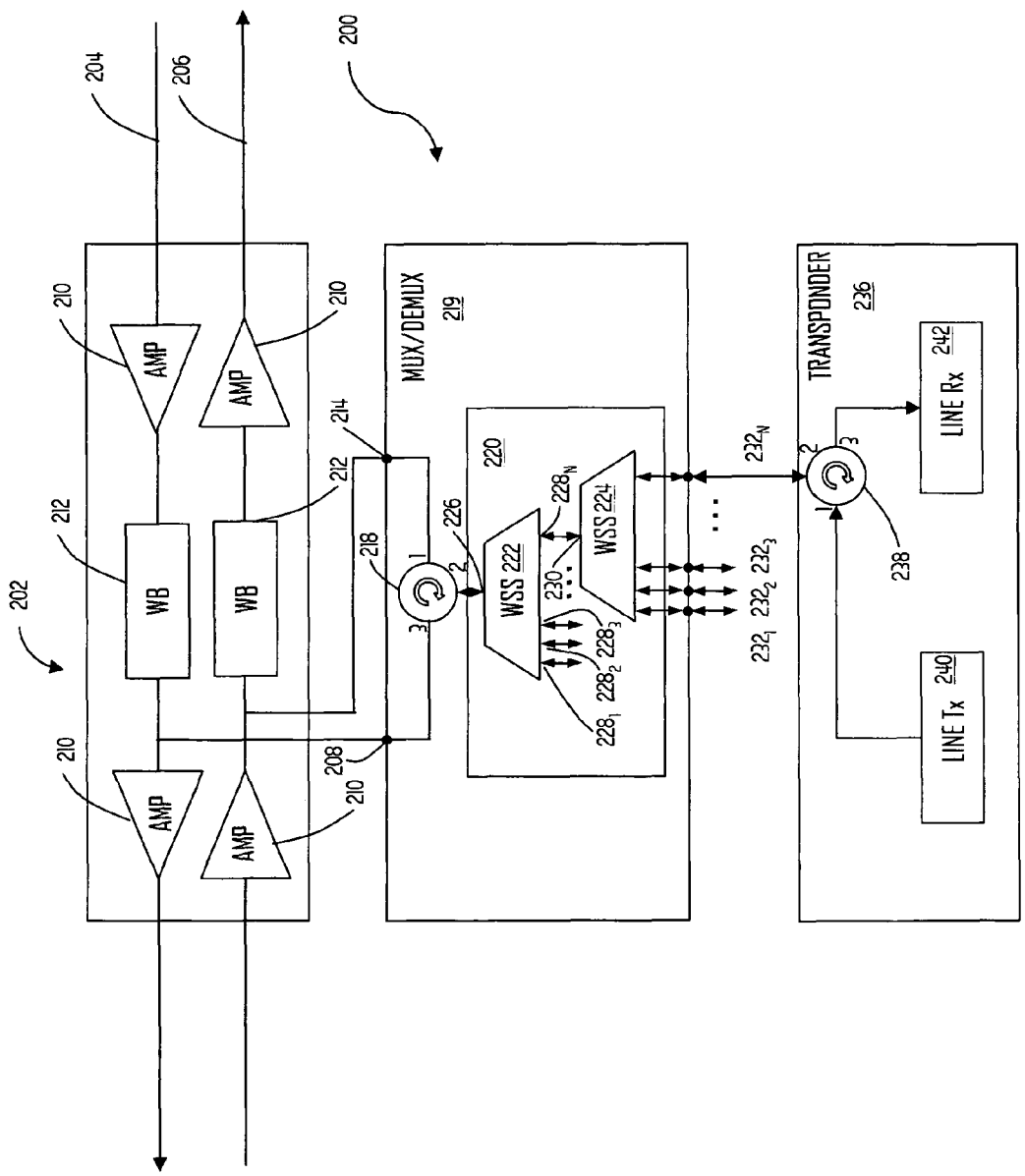
FIG. 2 is a schematic of an add/drop node including a MUX/DEMUX assembly in accordance with a first exemplary embodiment of the invention.

FIG. 2 is a schematic of an illustrative add/drop node (ADN) 200 in accordance with an aspect of the invention. The ADN 200 communicates with an optical transmission system 202 comprising a first optical fiber 204 and a second optical fiber 206. Optical signals are added to fiber 204 through add port 208. Note, a second add port could be present for East-bound traffic, and a second drop port could be present for West-bound traffic (not shown). Line 204 comprises a wavelength blocker 212 and a plurality of optical amplifiers 210. Although a pair of optical amplifiers 210 are shown in the drawing, a lesser or greater number of amplifiers may be provided depending upon the requirements of the system, power losses and the overall length of the optical connections. Similarly, line 206 comprises a pair of optical amplifiers 210 and a wavelength blocker 212. Wavelength channels that are to be dropped from line 206 traverse drop port 214. The dropped signals from line 206 of the optical transmission system 202 are coupled to port 1 of a 3-port optical circulator 218 that forms part of a tunable bidirectional multiplexer/demultiplexer (MUX/DEMUX) assembly 219. Optical circulators are commercially available components, and exhibit the property that light input to port 1 is output to port 2, and light input to port 2 is output to port 3. Wavelength channels that are added to the optical transmission system 202 are output from port 3 of optical circulator 218 to line 204 at 208. MUX/DEMUX assembly 219 further comprises a wavelength-selective switch (WSS) assembly 220 comprising a first 1×N WSS 222 and second 1×N WSS 224 arranged in a cascade as shown in FIG. 2. Port 2 of optical circulator 218 enables bidirectional communication and is coupled to the WSS 222. The 1×N WSSs are commercially available components that permit wavelengths input to the WSS at a single port to be selectively output (demultiplexed) to any one of N input/output ports of the WSS and conversely, to enable wavelengths input to the N input/output ports to be multiplexed at the single port. Two 1×N WSSs 222 and 224 are shown in the exemplary embodiment, so that it can provide more than N ports. However, it will be appreciated by those skilled in the art that the WSS assembly 220 may comprise any number of WSSs to provide more output ports, by using a fan-out configuration for the WSS. If a K-stage fan-out is used, where N ports of each WSS are connected to N WSS for the first K−1 stages, and each signal passes through K WSS, than WSS assembly can serve $N^k$ transceivers. This fan-out would use M WSS, where $$M = \sum_{j=1}^{k} N^{j-1}.$$

In the illustrative embodiment, WSS 222 has a single input/output port 226 coupled to port 2 of optical circulator 218. WSS 222 has a plurality of input/output ports $228_1$, $228_2$, $228_3$, $228_4$ ... $228_N$. The Nth input/output port $228_N$ of WSS 222 is shown coupled to a single port 230 of optical circulator 224. Like WSS 222, WSS 224 comprises a plurality of input/output ports $232_1$, $232_2$, $232_3$, $232_4$ ... $232_N$ which are hereinafter referred to as "transceiver ports." In the drawing, a single optical transceiver assembly 236 operating at wavelength $\lambda_N$ is shown for clarity; however a plurality of transceiver assemblies 236 will typically be coupled to the WSS assembly 219 to provide for processing a plurality of wavelength channels. In the embodiment depicted in FIG. 2, port $232_N$ of WSS 224 is coupled to bidirectional port 2 of an optical circulator 238 that forms part of optical transceiver assembly 236 (i.e., the optical circulator 238 is disposed or packaged within the housing of the optical transceiver assembly). Transceiver assembly 236 further comprises, in part, an optical line transmitter 240 and optical line receiver 242. Port 1 of the optical circulator 238 is coupled to optical line transmitter 240, and port 3 of optical circulator 238 is coupled to optical line receiver 242. In an alternative embodiment, the optical circulator 238 may form part of the MUX/DEMUX assembly 219 as described below and depicted in FIG. 4.

Figure 3:
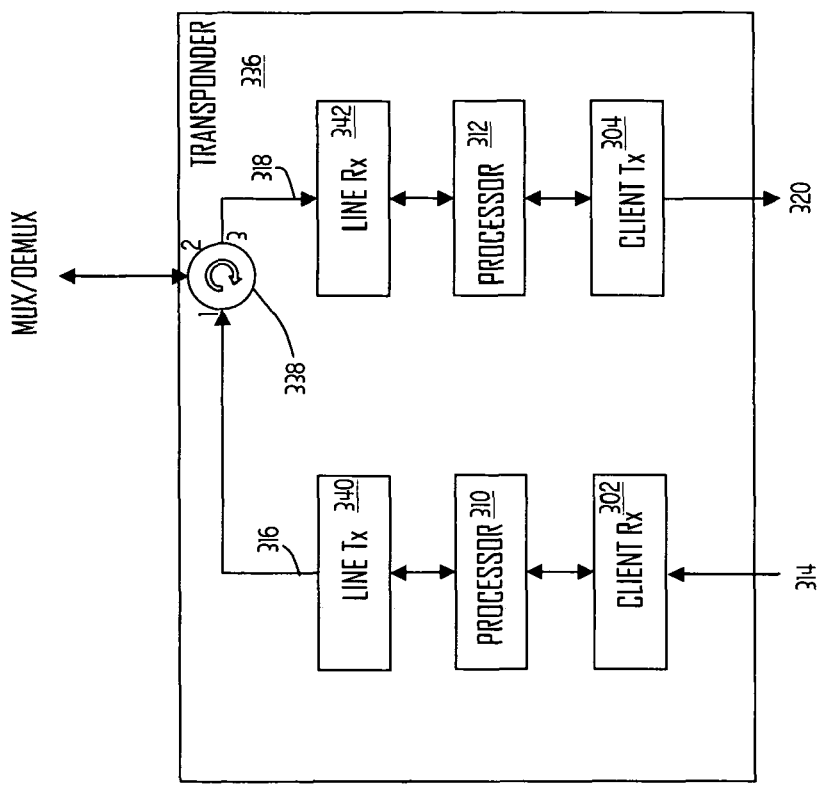
FIG. 3 is a schematic of an exemplary optical transceiver.

FIG. 3 is a schematic diagram of an illustrative optical transceiver 336 (corresponding to the transceiver assembly 236 depicted in FIG. 2) comprising a client receiver 302, client transmitter 304, line receiver 342, line transmitter 340 and processing devices 310 and 312. An optical signal 314 from equipment on the optical network (not shown) is received by the client receiver 302, and then converted by an optical/electrical (O/E) converter to an electrical signal. The converted signal is applied to processor 310 which implements mapping/de-mapping, monitor overheads and the like. Line transmitter 340 utilizes an electrical/optical (E/O) converter to convert the processed electrical signal to an optical signal 316 at a specific wavelength. In a similar fashion, an optical signal 318 at a specific wavelength is received by line receiver 342, and then converted to an electrical signal by an O/E converter. The converted signal is applied to processor 312, and subsequently applied to client transmitter 304 which utilizes an E/O converter to convert the electrical signal to a client optical signal 320 for transmission to other equipment on the network. The wavelength of the line transmitter 340 can be specifically tuned as required during operation by utilizing tunable lasers. This type of transceiver is therefore commonly referred to as a tunable transceiver. Line receiver 342 is typically a broadband receiver, which is constructed and arranged to receive an optical signal at any wavelength within an allowable range. In currently deployed DWDM systems, the wavelength of the incoming signal 318 to line receiver 342 is usually fixed by a wavelength sensitive demultiplexer. However, by utilizing a tunable filter or wavelength selective switch, the line receiver 342 can also be dynamically tuned to select an optical signal at a specific wavelength within the multiplexed incoming signal. In this embodiment, the output optical signal 316 from line transmitter 340 is coupled to port 1 of an optical circulator 338 that is disposed within the transceiver assembly 336 as described above with reference to FIG. 2. Port 2 of optical circulator 338 communicates with the bidirectional tunable MUX/DEMUX assembly 219 (see FIG. 2), and port 3 of optical circulator 338 provides optical signal 318 to line receiver 342.

Figure 4:
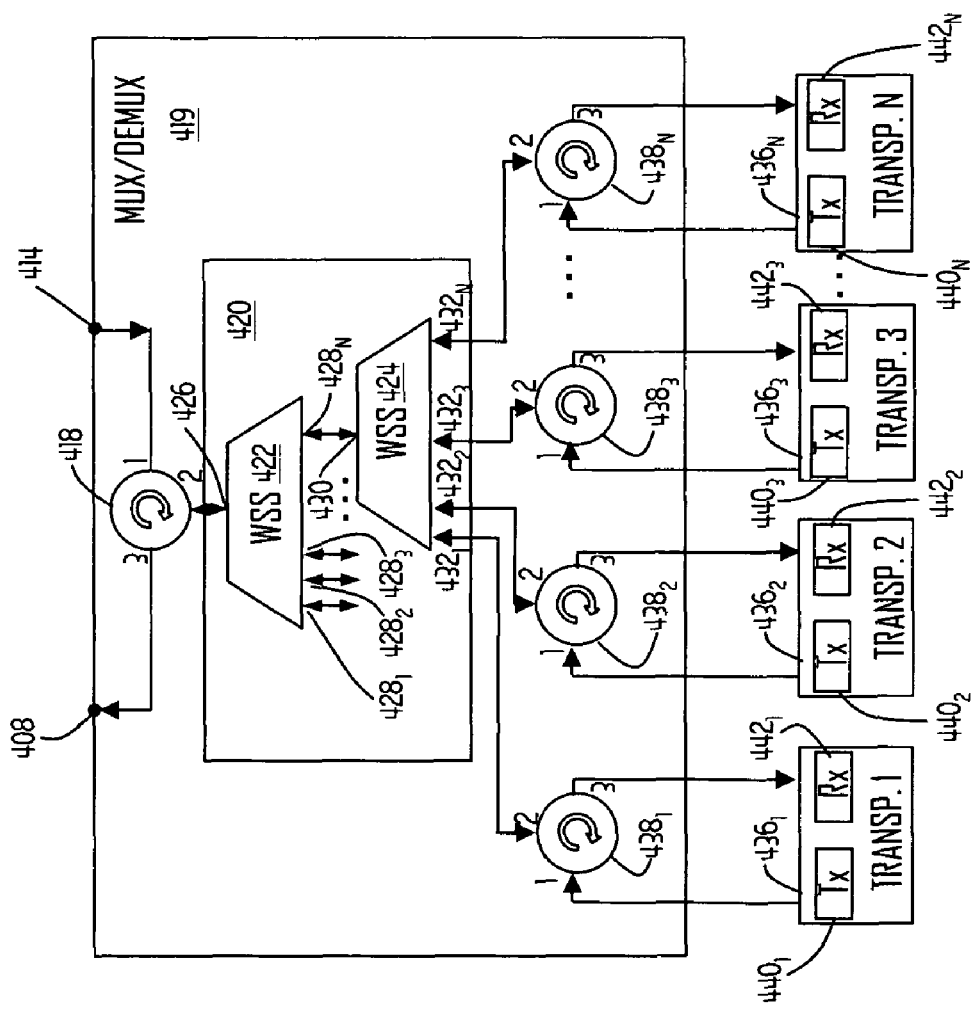
FIG. 4 is a schematic of a MUX/DEMUX assembly in accordance with a second exemplary embodiment of the invention.

Referring now to FIG. 4, there is depicted an alternative embodiment of a bidirectional MUX/DEMUX assembly 419, comprising a first optical circulator 418 (coupled to add port 408 and drop port 414), WSS assembly 420 and a plurality of second optical circulators $438_1$, $438_2$, $438_3$, $438_4$ ... $438_N$. WSS assembly 420 includes a pair of WSSs 422 and 424 as described above in the first exemplary embodiment. In this embodiment, the WSS assembly 420 and optical circulators $438_1$, $438_2$, $438_3$, $438_4$ ... $438_N$ are disposed or packaged within the same housing. WSS 422 has a single input/output port 426 coupled to port 2 of an optical circulator 418 that communicates with an optical transmission system (not shown) via the transmission system's add port 408 and drop port 414. WSS 422 has a plurality of input/output ports $428_1$, $428_2$, $428_3$, $428_4$ ... $428_N$. The Nth input/output port $428_N$ of WSS 422 is shown coupled to a single input/output port 430 of WSS 424. WSS 424 further comprises a plurality of input/output transceiver ports $432_1$, $432_2$, $432_3$, $432_4$ ... $432_N$, which are coupled to port 2 of each optical circulator $438_1$, $438_2$, $438_3$, $438_4$ ... $438_N$, respectively. Port 1 of each optical circulator $438_1$, $438_2$, $438_3$, $438_4$ ... $438_N$ receives signals that are to be added to the optical transmission system from a local terminal from a line transmitter $440_1$, $440_2$, $440_3$, $440_4$ ... $440_N$ of transceivers $436_1$, $436_2$, $436_3$, $436_4$ ... $436_N$, respectively. Conversely, signals that are dropped from the optical transmission system are communicated from port 3 of each optical circulator $438_1$, $438_2$, $438_3$, $438_4$ ... $438_N$ to a line receiver $442_1$, $442_2$, $442_3$, $442_4$ ... $442_N$ of transceivers $436_1$, $436_2$, $436_3$, $436_4$ ... $436_N$, respectively.

The use of shared components in the tunable MUX/DEMUX assemblies as described in the foregoing confers potential cost savings over current MUX/DEMUX designs. All embodiments halve the number of WSSs (relatively costly elements) needed. The first illustrative embodiment depicted in FIGS. 2 and 3 has the potential to reduce the number of optical circulators and patch cords that are required in the system. The second illustrative embodiment depicted in FIG. 4 has the potential to reduce penalties due to coherent crosstalk between wavelength channels attributable to back reflections between the MUX/DEMUX assembly and the transceivers at the local terminals. To avoid signal penalties due to coherent crosstalk, transmitted light that is back-reflected to a line receiver must be well below the received signal. The maximum acceptable level is denoted by R (for a 10 Gbps system R~=30 dB). This is a rough approximation, as the use of forward error correction (FEC) can relax this requirement. The implications are that the back reflection level of the WSS utilized in the assembly must be below R plus any loss from the WSS. If the loss of a WSS is −12 dB, and R=−30 dB, then the back reflection level of the WSS must be less than −42 dB.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

We claim:

1. A tunable bidirectional multiplexer/demultiplexer for adding and dropping wavelength channels between an optical transmission system and a tunable optical transceiver, comprising:

an add port for adding wavelength channels to the optical transmission system;

a drop port for dropping wavelength channels from the optical transmission system;

a transceiver port coupled to the add port and the drop port and coupling added and dropped wavelength channels to the tunable optical transceiver wherein the transceiver port, add port, drop port and tunable optical transceiver comprise an integrated component and wherein the tunable optical transceiver comprises a tunable laser supporting a plurality of wavelengths, the tunable optical transceiver configured to dynamically select a specific wavelength of the plurality of wavelengths for optical signals communicated between the transceiver port, add port and drop port;

a 1×N wavelength-selective switch in communication with the add port, the drop port, and the transceiver port; and an optical circulator coupled to a bidirectional input/output port on a first side of the 1×N wavelength-selective switch;

the add port, the drop port and the transceiver port configured such that an optical signal communicated from the transceiver port follows a first optical path from the 1×N wavelength-selective switch to the optical circulator to the add port, and an optical signal communicated from the drop port follows a second optical path from the optical circulator to the 1×N wavelength-selective switch to the transceiver port, a portion of the first and second optical paths being the same.

2. A tunable bidirectional multiplexer/demultiplexer for adding and dropping wavelength channels between an optical transmission system and a tunable optical transceiver, comprising:

an add port for adding wavelength channels to the optical transmission system;

a drop port for dropping wavelength channels from the optical transmission system;

a transceiver port coupled to the add port and the drop port and coupling added and dropped wavelength channels to the tunable optical transceiver wherein the transceiver port, add port, drop port and tunable optical transceiver comprise an integrated component and wherein the tunable optical transceiver comprises a tunable laser supporting a plurality of wavelengths, the tunable optical transceiver configured to dynamically select a specific wavelength of the plurality of wavelengths for optical signals communicated between the transceiver port, add port and drop port;

a 1×N wavelength-selective switch in communication with the add port, the drop port, and the transceiver port;

a first optical circulator coupled to a bidirectional input/output port on a first side of a wavelength-selective switch; and a second optical circulator coupled to a transceiver port on a second side of a wavelength-selective switch, the second optical circulator further being coupled to a line transmitter and a line receiver of the tunable optical transceiver;

the add port, the drop port and the transceiver port configured such that an optical signal communicated from the transceiver port to the add port follows a first optical path from the 1×N wavelength-selective switch to the optical circulator to the add port, and an optical signal communicated from the drop port follows a second optical path from the optical circulator to the 1×N wavelength-selective switch to the transceiver port, a portion of the first and second optical paths being the same.

3. A tunable bidirectional multiplexer/demultiplexer for adding and dropping wavelength channels between an optical transmission system and a tunable optical transceiver, comprising:

an add port for adding wavelength channels to the optical transmission system;

a drop port for dropping wavelength channels from the optical transmission system;

a transceiver port coupled to the add port and the drop port and coupling added and dropped wavelength channels to the tunable optical transceiver wherein the transceiver port, add port, drop port and tunable optical transceiver comprise an integrated component and wherein the tunable optical transceiver comprises a tunable laser supporting a plurality of wavelengths, the tunable optical transceiver configured to dynamically select a specific wavelength of the plurality of wavelengths for optical signals communicated between the transceiver port, add port and drop port;

a first optical circulator coupled to the drop port and the add port;

a 1×N wavelength-selective switch including a single input/output port on a first side for receiving and outputting multiplexed optical signals, and a plurality of input/output ports on a second side for receiving a plurality of multiplexed or individual optical signals, the input/output port on the first side being coupled to the first optical circulator, one of the input/output ports on the second side of the 1×N wavelength-selective switch configured as a transceiver port for coupling added and dropped wavelength channels to the tunable optical transceiver; and a second optical circulator coupled to the transceiver port on the second side of a wavelength-selective switch, the second optical circulator further being coupled to a line transmitter and line receiver of the tunable optical transceiver;

the wavelength-selective switch and ports configured such that an optical signal communicated from the transceiver port follows a first optical path from the 1×N wavelength-selective switch to the optical circulator to the add port, and an optical signal communicated from the drop port follows a second optical path from the optical circulator to the 1×N wavelength-selective switch to the transceiver port, a portion of the first and second optical paths being the same.

4. A tunable bidirectional multiplexer/demultiplexer for adding and dropping wavelength channels between an optical transmission system and a tunable optical transceiver, comprising:

an add port for adding wavelength channels to the optical transmission system;

a drop port for dropping wavelength channels from the optical transmission system;

a first optical circulator coupled to the drop port and the add port;

a transceiver port coupled to the add port and the drop port and coupling added and dropped wavelength channels to the tunable optical transceiver wherein the transceiver port, add port, drop port and tunable optical transceiver comprise an integrated component and wherein the tunable optical transceiver comprises a tunable laser supporting a plurality of wavelengths, the tunable optical transceiver configured to dynamically select a specific wavelength from the added and dropped wavelength channels;

a 1×N wavelength-selective switch including a single input/output port on a first side for receiving and outputting multiplexed optical signals, and a plurality of input/output ports on a second side for receiving a plurality of multiplexed or individual optical signals, the input/output port on the first side being coupled to the first optical circulator, of the input/output ports on the second side of the 1×N wavelength-selective switch configured as a second transceiver port; and a second optical circulator coupled to the second transceiver port on a second side of the 1×N wavelength-selective switch, the second optical circulator further being coupled to a line transmitter and a line receiver of the tunable optical transceiver, the 1×N wavelength-selective switch and ports configured such that an optical signal communicated from the transceiver port follows a first optical path from the 1×N wavelength-selective switch to the optical circulator to the add port, and an optical signal communicated from the drop port follows a second optical path from the optical circulator to the 1×N wavelength-selective switch to the transceiver port, a portion of the first and second optical paths being the same.

5. The tunable multiplexer/demultiplexer recited in claim 4, wherein the 1×N wavelength-selective switch is arranged in a cascading relationship.

6. A tunable bidirectional multiplexer/demultiplexer for adding and dropping wavelength channels between an optical transmission system and a tunable optical transceiver; comprising:

an add port for adding wavelength channels to the optical transmission system;

a drop port for dropping wavelength channels from the optical transmission system;

a first optical circulator coupled to the drop port and the add port;

a transceiver port coupled to the add port and the drop port and coupling added and dropped wavelength channels to the tunable optical transceiver wherein the transceiver port, add port, drop port and tunable optical transceiver comprise an integrated component and wherein the tunable optical transceiver comprises a tunable laser supporting a plurality of wavelengths, the tunable optical transceiver configured to dynamically select a specific wavelength of the plurality of wavelengths for optical signals communicated between the transceiver port, add port and drop port;

a 1×N wavelength-selective switch including a single input/output port on a first side for receiving and outputting multiplexed optical signals, and a plurality of input/output ports on a second side for receiving a plurality of multiplexed or individual optical signals, the input/output port on the first side being coupled to the first optical circulator, one of the input/output ports on the second side of the 1×N wavelength-selective switch configured as a second transceiver port; and a second optical circulator coupled to the second transceiver port on a second side of the 1×N wavelength-selective switch, the second optical circulator further being coupled to a line transmitter and line receiver of the optical transceiver, the 1×N wavelength-selective switch and ports configured such that an optical signal communicated from the transceiver port follows a first optical path from the 1×N wavelength-selective switch to the optical circulator to the add port, and an optical signal communicated from the drop port follows a second optical path from the optical circulator to the 1×N wavelength-selective switch to the transceiver port, a portion of the first and second optical paths being the same.

7. The tunable multiplexer/demultiplexer recited in claim 1, wherein the 1×N wavelength-selective switch is configured in a fan-out configuration.

8. The tunable multiplexer/demultiplexer recited in claim 2, wherein the 1×N wavelength-selective switch is configured in a fan-out configuration.

9. The tunable multiplexer/demultiplexer recited in claim 3, wherein the 1×N wavelength-selective switch is configured in a fan-out configuration.

10. The tunable multiplexer/demultiplexer recited in claim 6, wherein the 1×N wavelength-selective switch is configured in a fan-out configuration.

* * * * *